(12) United States Patent
Zhou

(10) Patent No.: US 6,612,587 B2
(45) Date of Patent: Sep. 2, 2003

(54) MANUALLY TIGHTENED CHUCK

(76) Inventor: Wenhua Zhou, No. 200, Ji Chang Road, Lu Qiao District, Taizhou City, Zhejang Province 318050 P.R. (CN)

( * ) Notice: Subject to any disclaimer, the term of this patent is extended or adjusted under 35 U.S.C. 154(b) by 0 days.

(21) Appl. No.: 10/162,311

(22) Filed: Jun. 3, 2002

(65) Prior Publication Data

US 2003/0141675 A1 Jul. 31, 2003

(30) Foreign Application Priority Data

Jan. 30, 2002 (CN) .......................................... 02202748

(51) Int. Cl.⁷ .............................................. B23B 31/12
(52) U.S. Cl. ........................................ 279/62; 279/902
(58) Field of Search .............................. 279/60–62, 902

(56) References Cited

U.S. PATENT DOCUMENTS

| | | | | | |
|---|---|---|---|---|---|
| 897,335 | A | * | 9/1908 | Almond | 279/62 |
| 911,012 | A | * | 1/1909 | Jacobs | 279/62 |
| 1,123,541 | A | * | 1/1915 | Jacobs | 279/62 |
| 1,476,903 | A | * | 12/1923 | McConnell | 279/62 |
| 5,125,673 | A | * | 6/1992 | Huff et al. | 279/62 |
| 5,531,461 | A | * | 7/1996 | Huff et al. | 279/62 |
| 5,669,616 | A | * | 9/1997 | Ho | 279/62 |
| 5,934,689 | A | * | 8/1999 | Montjoy | 279/62 |
| 5,934,690 | A | * | 8/1999 | Lin | 279/62 |
| 6,474,657 | B1 | * | 11/2002 | Fan-Chiang et al. | 279/62 |

* cited by examiner

Primary Examiner—Steven C. Bishop
(74) Attorney, Agent, or Firm—Gardere Wynne Sewell LLP

(57) ABSTRACT

A manually tightened chuck including a hollow chuck body member, provided with three bores inclined forwardly toward a central axis. A jaw is slidable in each inclined bore, a nut is sheathed on the peripheral surface of the chuck body member, and is interconnected with each jaw through threads. A peripheral surface of the nut is provided with a front sleeve, and on a peripheral surface of the chuck body member a rear sleeve is sheathed also. In the middle of the chuck body member a stepped part extends radially outwardly and includes a surface opposite to a rear end surface of the nut. Plural bearing balls are disposed in circular grooves formed in the opposed surfaces of the nut and chuck body member.

10 Claims, 1 Drawing Sheet

US 6,612,587 B2

MANUALLY TIGHTENED CHUCK

BACKGROUND

In the present art, a manually tightened chuck generally comprises a chuck body member, jaw, nut, front sleeve and rear sleeve For example, authorized Chinese Patent CN 2440611 applied by the applicant discloses a manually tightened chuck, the chuck comprises a chuck body member, jaw, nut, front sleeve and rear sleeve. Three jaws are placed, respectively, in three inclined bores distributed uniformly on the chuck body member. Between the nut and the jaw a thread connection is adopted, the rear end of the nut provides a thrust bearing, the rear end of the thrust bearing is provided with a blocking ring, and on the rear end of the chuck body member the rear sleeve is assembled. The nut is of duplex-half structure. The duplex-half structure is combined into an integral through a steel sleeve, parallel planes are adopted for torque transmission between the front sleeve and the rear sleeve and between the front end of the front sleeve and the chuck body member there is provided a blocking sleeve. The disadvantages of the manually tightened chuck are: since the thrust bearing and blocking sleeve provided in the rear end of the thrust bearing are used to achieve relative rotational movement between the nut and chuck body member, its structure is more complicated, so as to increase the cost for machining and assembling.

SUMMARY OF THE INVENTION

The present invention provides an improved manually tightened chuck, particularly a manually tightened chuck mounted in machining equipment, for example, a drilling machine tool. An object of the invention is to overcome the disadvantages of present art mentioned above and provide an improved chuck, the structure providing for rotational movement between the nut and the chuck body member is more simple for reducing cost of machining and assembling.

According to a manually tightened chuck provided by the invention, the chuck comprises a hollow chuck body member, having three inclined bores along its periphery equally spaced and inclined forwardly toward a central axis of the chuck body member. In each inclined bore a jaw is installed slidably. On the outer peripheral surface of the chuck body member, a nut is sheathed, and is connected with each jaw through threads. The outer peripheral surface of the nut is provided with a front sleeve, and between the front sleeve and the nut there is provided structure for torque transmission. The outer peripheral surface of the chuck body member is provided with a rear sleeve and at the middle of the chuck body member a stepped part extends radially outwardly and includes a surface opposed to the rear end face of the nut. Circular grooves or rails are machined on the above-mentioned surface and/or on the rear end face of the nut for receiving a plurality of rolling bearing balls.

To compare the manually tightened chuck according to the invention with the prior art, the present invention has the following advantages: since rolling balls are placed directly between the nut and the chuck body member whereby both of them may rotate relatively, a blocking ring and rolling ball holder may be eliminated, not only to cause the integrated structure of the chuck to be more simple and compact, but also in the meantime to reduce the cost for machining and assembling.

Further features and advantages of the invention will be explained in detail in conjunction with the embodiment shown by the accompanying drawing.

DETAILED DESCRIPTION OF A PREFERRED EMBODIMENT

Figure 1:
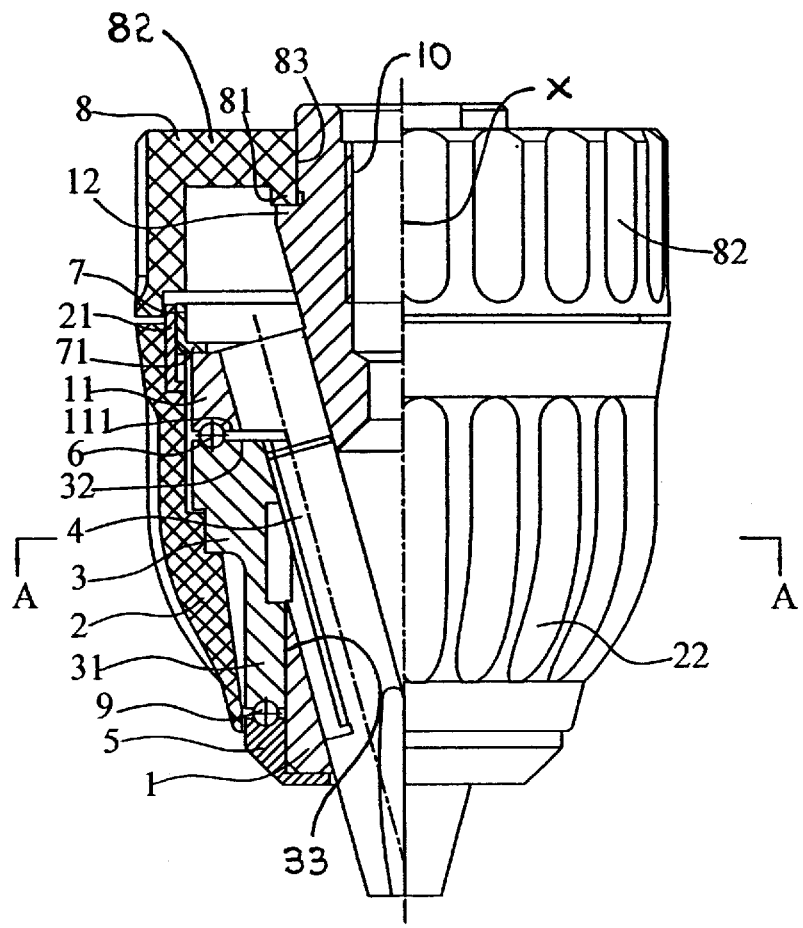
FIG. 1 is a central longitudinal section view of a preferred embodiment of a manually tightened chuck according to the invention.

Before explaining the invention in detail, related terminologies are defined as follows:

The so-called "front end" in the invention refers to the end for holding a drill bit by the respective jaws, i.e. the lower end viewing FIG. 1, and the so-called "rear end" in the invention refers to the end to be connected with a machine tool, for example, a drilling machine tool, i.e. the upper end viewing FIG. 1.

Figure 2:
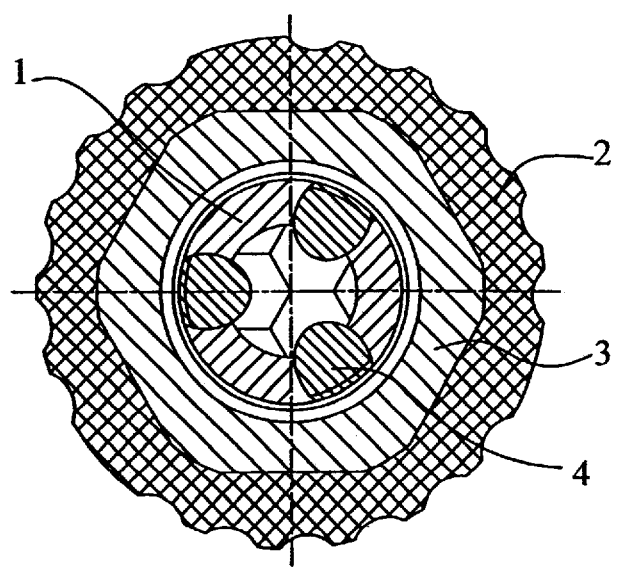
FIG. 2 is a section view taken along line A—A of FIG. 1, and showing the structure for torque transmission between the front sleeve and the nut.

Referring to FIGS. 1 and 2, a preferred embodiment of a manually tightened chuck according to the invention is shown, and comprises a hollow chuck body member 1, having a through stepped bore 10, the upper or rear end of the stepped bore is adapted to be connected with the spindle of a drilling machine tool, or the like, not shown, by means of threads. The chuck body member 1 includes three inclined bores inclined forwardly toward the central axis "x" of the chuck body member and are equally spaced. In each inclined bore, a jaw 4 is installed slidably, and on the outer peripheral surface of the chuck body member 1, a nut 3 is sheathed, and it is interconnected with each said jaw 4 through cooperating threads, not shown.

A front sleeve 2 is provided on the outer peripheral surface of the nut 3, and between the sleeve and the nut suitable structure for torque transmission is provided as shown in FIG. 2, and as described further herein. When rotating front sleeve 2, through the aforementioned structure, torque is transmitted to the nut 3. As shown in FIG. 2, the nut 3 and the front sleeve 2 have surfaces fitted to each other, in the shape, in cross section, of a right hexagon, approximately, and forming the aforementioned structure.

As shown in FIG. 1, approximately in the middle of the chuck body member 1, a stepped body part 11 extends radially outwardly and includes a surface 111 opposite to a rear end face 32 of the nut 3. Circular grooves or rails are formed opposite each other on the surface 111 and the rear end face 32 of nut 3, as shown in FIG. 1. A plurality of rolling bearing balls 6 are placed in the aforementioned grooves or rails, as shown in FIG. 1, and through these rolling balls 6 related rotational movement between the nut 3 and the chuck body member 1 may be achieved. The circular grooves or rails may be machined into the surface 111 and/or the rear end surface 32 for simplifying manufacturing.

The outer peripheral surface of the chuck body member 1 also supports a rear sleeve 8 sheathed thereon, the rear sleeve 8 comprising a peripheral wall and an end wall 82 extended from the peripheral wall radially inwardly. An inner bore 83 is formed in the end wall 82 and in the lower part of the end wall, adjacent the inner bore, a flange 81 is formed. A lower surface of the flange 81 rests against an upwardly facing surface formed by a radially outwardly extending shoulder 12 at the rear end of chuck body member 1.

In the preferred embodiment, the nut 3 is of integrated structure, and has an axially extended part 31 extended forwardly. The extended part 31 has an inner bore 33 fitted slidably with an outer peripheral surface of the chuck body member 1, as shown, so as to prevent the nut 3 from radial scurrying movement during operation of the chuck. The front end of the chuck body member 1 is provided with a blocking sleeve 5, and the blocking sleeve 5 has an end wall and a peripheral wall extended from the end wall rearwardly, as shown. The aforementioned peripheral wall of sleeve 5 has an inner bore stationary fitted to a corresponding outer peripheral surface of the chuck body member 1 for fixing the blocking sleeve 5 on the front or lower end of the chuck body member 1.

As shown in FIG. 1, the peripheral wall of sleeve 5 has an end face opposite to the front end of the extended part 31 of the nut 3, and on these two opposite end faces concave circular grooves or rails are machined opposite each other, respectively. A plurality of rolling bearing balls 9 are placed in two circular grooves or rails just described above, so as to cause nut 3 to be orientated axially and to be prevented from axial scurrying movement. Nut 3 may be rotated relative to the blocking sleeve 5, thereby providing operating stability and strength saving. The circular grooves or rails on sleeve 5 and nut 3 may be machined, to simplify manufacturing.

Further in accordance with the preferred embodiment, a stepped bore is formed in the rear end of front sleeve 2, and a steel sleeve 21 is fixed in it, FIG. 1. A blocking sleeve 7 is fixed in the steel sleeve 21 also, and the blocking sleeve 7 includes an end wall 71 which extends radially inwardly. The lower surface of end wall 71 rests against an upward facing surface of the stepped part 11 of the chuck body member 1 so as to achieve the axial orientation of the front sleeve 2, and insure that the front sleeve may not detach from the chuck body member 1.

As shown in FIG. 1, in the above described embodiment, on the outer peripheral surface of both the front sleeve 2 and the rear sleeve 8, a plurality of convex ridges 22 and concave grooves 82 are provided for the convenience of installing and replacing drill bits by the chuck operator.

The operation procedure of the manually tightened chuck of the invention is as follows: firstly, by means of the threaded bore 10 of the upper end of chuck body member 1, the chuck is fixed to the spindle of a drilling machine tool, not shown, by rotating the front sleeve 2 counterclockwise (seen from the front end of the chuck). The nut 3 rotates with the front sleeve 2, so as to cause the three jaws 4 to move upwardly simultaneously to increase a bit receiving opening between the jaws. Next, a drill bit, not shown, is inserted into the aforementioned opening, the front sleeve 2 is rotated clockwise, so as to cause the nut 3 to rotate, and causing the three jaws 4 to move downward, viewing FIG. 1, and tighten against the drill bit after which drilling could be performed. If the drill bit wants to be replaced, the operation procedure is vice versa, and there is no more needed to be described here.

The above described embodiment is a preferred form of the invention, and not for the limitation of it. Certain substitutions and modifications may be made without departing from the scope and spirit of the appended claims.

What is claimed is:

1. A manually tightened chuck comprising:
    a hollow chuck body member, said chuck body member including three inclined bores inclined forwardly and toward a central axis and being equally spaced;
    a jaw disposed slidably in each inclined bore;
    a nut sleeved over said chuck body member, said nut being interconnected with each said jaw through cooperating threads;
    a front sleeve disposed on a peripheral surface of said nut and operably engaged with said nut by torque transmission structure, said front sleeve including a stepped bore formed in a rear end of said front sleeve;
    a rear sleeve disposed over a peripheral surface of said chuck body member;
    a middle portion of said chuck body member including a stepped part extended radially outwardly, said stepped part including a facing surface opposite a rear end surface of said nut;
    a steel sleeve disposed in said stepped bore of said front sleeve;
    a blocking sleeve engaged with said steel sleeve and including an end wall extended radially inwardly and having a lower surface resting against an upper surface of said stepped part of said chuck body member;
    circular groove means formed in at least one of said facing surface and said rear end surface of said nut; and
    a plurality of bearing balls disposed in said groove means.

2. A manually tightened chuck as set forth in claim 1 wherein:
    said nut includes an extended part extended forwardly, wherein said extended part includes an inner bore slide fitted with a peripheral surface of said chuck body member.

3. A manually tightened chuck as set forth in claim 2 including:
    a blocking sleeve fixed on a front end of said chuck body member, said blocking sleeve including an end wall and a peripheral wall extended from said end wall rearwardly.

4. A manually tightened chuck as set forth in claim 3, wherein:
    said peripheral wall has an end surface opposite to a front end surface of said extended part of said nut;
    further groove means are formed on at least one of said end surface and said front end surface of said nut; and
    plural bearing balls are disposed in said further groove means.

5. A manually tightened chuck as set forth in claim 1, wherein:
    said nut and said front sleeve have surfaces fitted to each other, the cross section of said fitted surfaces being of a right polygon, at least approximately.

6. A manually tightened chuck as set forth in claim 1 wherein:
    said rear sleeve includes a peripheral wall and an end wall extended from said peripheral wall radially inwardly, wherein an inner bore is formed in said end wall, a flange is formed in a lower part of said end wall adjacent said inner bore, and a lower surface of said flange rests against a surface of a shoulder extended radially outwardly at a rear end of chuck body member.

7. A manually tightened chuck as set forth in claim 1, wherein:
    said peripheral surfaces of both said front sleeve and said rear sleeve include a plurality of convex ridges and concave grooves, respectively.

8. A manually tightened chuck comprising:
    a chuck body member, said chuck body member including plural inclined bores inclined forwardly and toward a central axis;

a jaw disposed slidably in each inclined bore;

a nut sleeved over said chuck body member, said nut being operably interconnected with each said jaw;

a front sleeve disposed on a peripheral surface of said nut and operably engaged with said nut by torque transmission structure;

a middle portion of said chuck body member including a stepped part extended radially outwardly, said stepped part including a facing surface opposite a rear end surface of said nut;

circular groove means formed in at least one of said facing surface and said rear end surface of said nut;

a plurality of bearing balls disposed in said groove means;

a bore formed in a rear end of said front sleeve; and a retaining sleeve disposed in said bore in said rear end of said front sleeve.

9. A manually tightened chuck as set forth in claim 8, wherein:

said nut and said front sleeve have surfaces fitted to each other.

10. A manually tightened chuck as set forth in claim 9 including:

a rear sleeve including a peripheral wall and an end wall extended from said peripheral wall radially inwardly, wherein an inner bore is formed in said end wall, a flange is formed in a lower part of said end wall adjacent said inner bore, and a lower surface of said flange rests against a surface of a shoulder extended radially outwardly at a rear end of chuck body member.

* * * * *